Nov. 19, 1940.  W. G. CALKINS ET AL  2,222,251
METHOD OF MAKING POROUS METAL STRUCTURES AND BEARINGS
Filed March 4, 1938  2 Sheets-Sheet 2
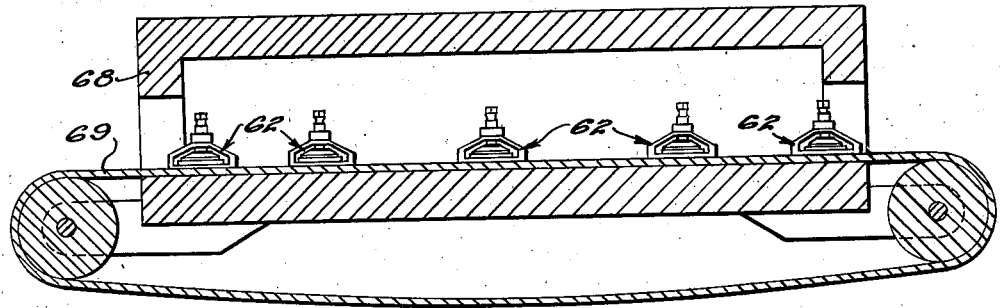
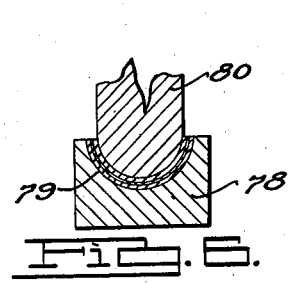
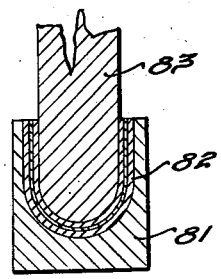
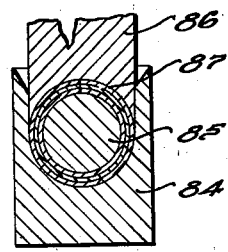
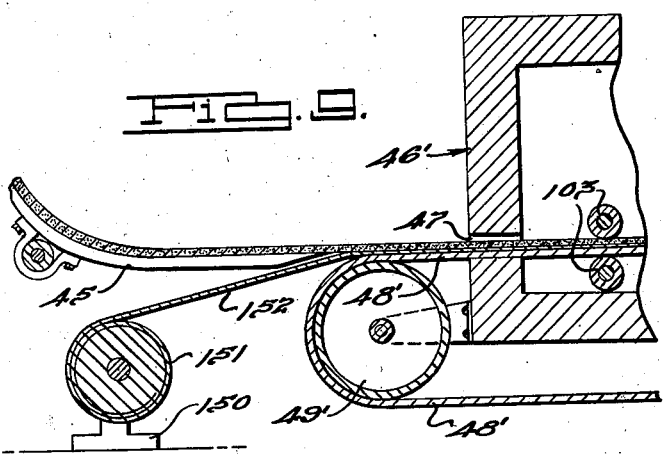
INVENTORS
WILLIAM G. CALKINS AND
BY ANTHONY J. LANGHAMMER.
ATTORNEYS.

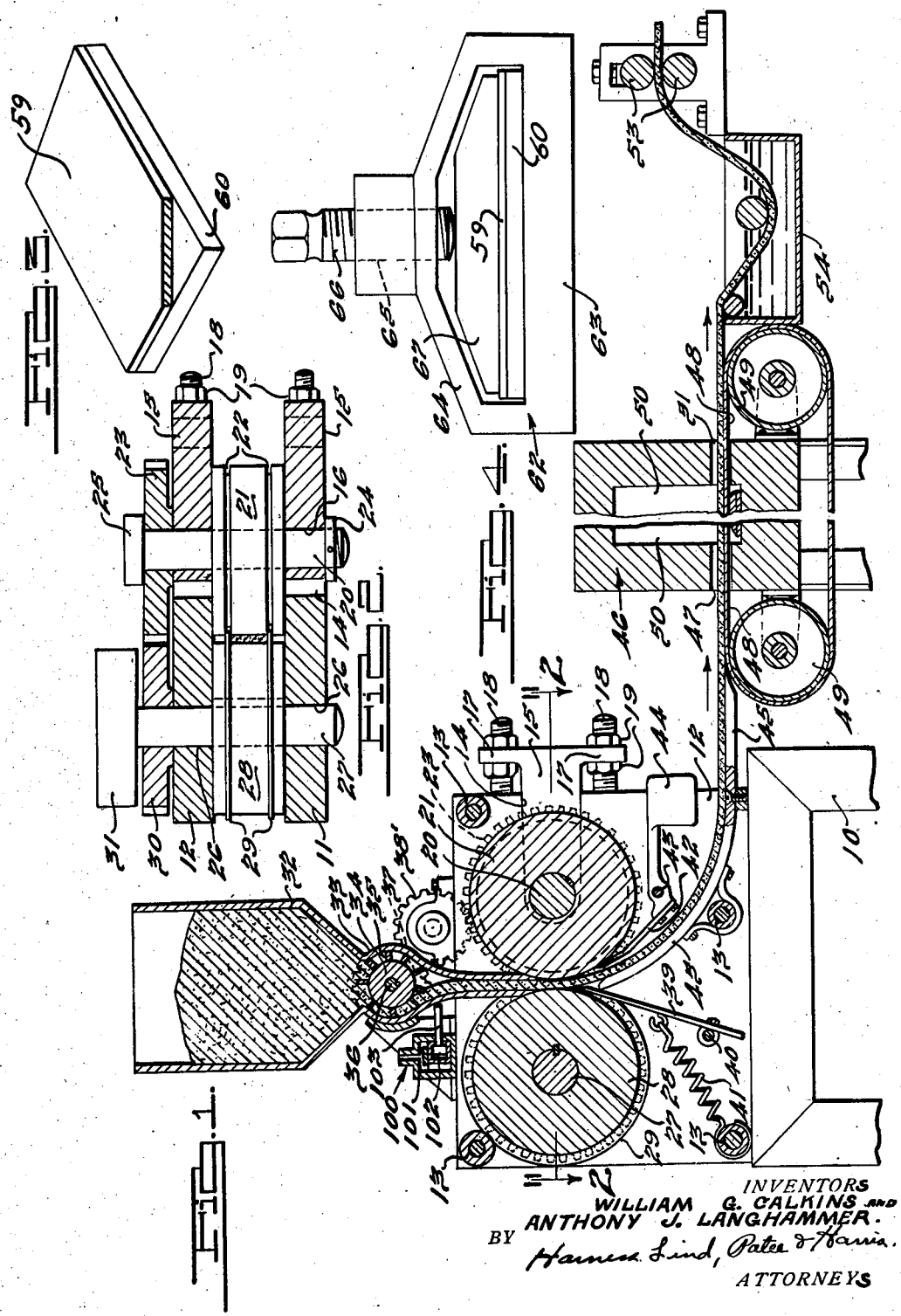

Patented Nov. 19, 1940

2,222,251

UNITED STATES PATENT OFFICE 2,222,251

METHOD OF MAKING POROUS METAL STRUCTURES AND BEARINGS

William G. Calkins and Anthony J. Langhammer, Detroit, Mich., assignors to Chrysler Corporation, Highland Park, Mich., a corporation of Delaware Application March 4, 1938, Serial No. 193,864

5 Claims. (Cl. 29—149.5)

This invention relates to an improved method for manufacturing bearings and bearing material and is a continuation in part of our copending application, Serial Number 77,324, filed May 1, 1936, issued Oct. 31, 1939 as Patent No. 2,178,529.

More particularly, the invention pertains to improvements in a method for manufacturing bearings and bearing material having porous metal bearing surfaces of the character which have a substantial lubricant absorbing capacity or self-contained lubricant content.

One of the main objects of the invention is the provision of a method of this character for producing bearing material in the form of sheet-stock which may be employed in its flat shape or readily formed to a desired contour.

A further object of the invention is to provide a method of this character by which can be produced sintered sheet-like bearing material that may be deformed to a comparatively large variety of shapes and which is sufficiently flexible to withstand repeated flexure without failure.

An additional object of the invention is the provision of bearing material forming method by which compressed, powdered metal stock may be simultaneously sintered and bonded to a reinforcing backing.

A further object of the invention is to provide an improved method for manufacturing sheet-like porous metal bearing material in a continuous process and by which comparatively long strips of such material can be made in a continuous manner.

Other objects of the invention are to provide improved method for forming finely divided powdered porous metal constituents into a continuous ribbon of uniform thickness; to provide an improved step in a method of this kind for feeding measured quantities of such mixtures of powdered constituents to the compressing apparatus at a rate proportional to the speed of operation of the latter so as to maintain uniform density and porosity as well as thickness.

A still further object of the invention is to provide an improved method for continuously applying elongated strips of sheet-like porous metal bearing material to correspondingly elongated strips of reinforcing backing metal.

Illustrative embodiments of the invention are shown in the accompanying drawings, in which:

Fig. 1 is a fragmentary, interrupted elevational view showing porous metal forming apparatus embodying the invention, partly in section and with parts removed to disclose the underlying structure.

Fig. 2 is a horizontal sectional view taken on the line 2—2 of Fig. 1.

Fig. 3 is a perspective view showing a sheet of our improved porous metal bearing material bonded in accordance with the invention in superimposed relation on a reinforcing backing.

Fig. 4 is an illustrational side elevational view showing the superimposed backing and bearing material layers of Fig. 3 in a clamped relation suitable for the application of heat to sinter the bearing layer and effect a bond between the layers.

Fig. 5 is a diagrammatic longitudinal sectional view of a furnace for heating the backing and bearing material illustrated in Fig. 4 to effect sintering and produce a bond therebetween.

Fig. 6 is a fragmentary, vertical, sectional view of die forming apparatus by which a finished blank comprising a backing and a layer of porous metal bearing material may be brought to semi-cylindrical shape.

Fig. 7 is a fragmentary, sectional view of die forming apparatus for performing the initial forming operation upon a bearing blank preparatory to bringing it to final cylindrical shape.

Fig. 8 is a fragmentary sectional view of die forming apparatus for completing the cylindrical formation which the apparatus shown in Fig. 7 is adapted to commence.

Fig. 9 is a fragmentary, vertical, sectional view of an apparatus embodying a further development of the invention by which compressed, powdered metals may be simultaneously sintered and bonded to a sheet or strip of metal backing.

In the form of the invention illustrated in the drawings, our improved porous metal forming method may be performed by apparatus which includes a support 10 on which is mounted a frame structure comprising spaced side members 11 and 12 which are secured together and held in fixed, spaced relation by transverse bars 13. Each side member 11 and 12 is provided with a slot 14 extending inwardly from its right vertical edge, as viewed in Fig. 1, in which is slidably mounted a block 15 having a bore 16 formed in its inner end. Each block 15 has outwardly extending flanges 17 on its external end provided with apertures through which threaded studs 18, rigidly mounted in the frame side members 11 and 12, respectively, extend. Threaded on each stem 18 is a pair of nuts 19 between which the flanges 17 of the block 15 are disposed. The nuts 19 may be adjusted to selectively position the blocks 15 in their respective slots 14 and to maintain the blocks against unintended movement.

Journalled in the bores 16 of the slidable blocks 15 is a shaft 20 which extends transversely of the frame structure and on the intermediate portion of which is rigidly mounted a roller 21 having spaced grooves 22 formed in the periphery. A gear 23 is also non-rotatably fixed to the shaft 20 and disposed adjacent the side member 12 of the frame structure. The shaft 20 is held against axial movement relative to the slide blocks 15 by collars 24 and 25 which are fixed on its respectively opposite ends and disposed externally of the frame structure, the collar 24 being located adjacent the slide block 15 of one side frame member and the collar 25 being disposed adjacent the gear 23.

The side members 11 and 12 of the frame member are provided with registering bores 26 in which are journalled a transversely extending shaft 27 having a roller 28 non-rotatably mounted on its intermediate portion and disposed between the sides 11 and 12 of the frame. The roller 28 has external ribs 29 on its periphery which fit into the grooves 22 of the roller 21 in order to provide a passage between the peripheries of the rollers 21 and 28 having sharply defined edge extremities. Non-rotatably mounted on the shaft 27 is a gear 30 having teeth thereon meshed with the teeth of the gear 23. One end of the shaft 27 is provided with a driving member, diagrammatically illustrated at 31, which may comprise a gear, pulley or other suitable means by which the shaft 27 and roller 28 thereon may be rotated by a suitable motor or other prime mover. The peripheries of the rollers 21 and 28 may be adjustably positioned with respect to each other by manipulation of the nuts 19 on the threaded stems 18 which are adapted to shift the slidable blocks 15 inwardly and outwardly with respect to the slots of the side members 11 and 12 of the frame in order to bring the peripheries of the rollers 21 and 28 closer together or farther apart as desired. In this manner, the thickness of the article compressed between the rollers may be conveniently predetermined. The diameters of the rolls 21 and 28, as well as their spaced relationship, are preferably predetermined to facilitate the formation of briquettes of different thicknesses. It is found that more satisfactory results are obtained by reducing the diameter of the rolls as the thickness of the strip formed therebetween is decreased, and increasing the diameters of the rolls as the thickness of such strip is increased.

Mounted on the frame structure of the porous metal forming apparatus shown in Fig. 1 is a hopper 32 having an intermediate portion 33 of somewhat cylindrical cross-section in which is mounted a dispensing device 34 having radially extending vanes 35. The dispensing device 34 is non-rotatably mounted on a shaft 36 journalled in the side walls of the intermediate portion 33 of the hopper and this shaft is drivingly connected by gears 37 and 38' with the gear 23 by which the roller 21 is driven in timed relation with respect to the roller 28 and gear 30. During operation of the rollers the dispensing device 34 is rotated in timed relationship therewith so as to discharge measured quantities of the contents of the hopper from the latter at a rate proportional to the speed of operation of the rollers. The hopper 32 has a downwardly extending tapered discharge spout 38 which is adapted to direct the material discharged from the hopper into the space between the rollers 21 and 28 and between the ribs 29 of the roller 28. Mounted on the frame structure of the forming apparatus is a vibrator, generally designated by the numeral 100 in Fig. 1, by which the discharge spout 38 and walls of the hopper 32 can be vibrated to feed powdered material to the rolls. This vibrator includes an air cylinder 101, piston 102, and piston rod 103 engaging the discharge spout 38 and suitable valve mechanism (not shown) by which vibratory movement of the piston is controlled. A scraper 39 is pivotally mounted at 40 on the side member 12 of the frame structure and is provided at its upper end with a knife edge which is yieldingly held in contact with the periphery of the roller 28 by a coil spring 41 as illustrated in Fig. 1.

A similar scraper 42 is pivotally mounted at 43 on the side member 12 of the frame structure and yieldably held in contact with the periphery of the roller 21, and particularly the portion thereof between the groove 22 of the roller 21 by a counter-weight 44 which normally tends to rotate the scraper 42 in a clockwise direction as viewed in Fig. 1.

Disposed between the scrapers 39 and 42 is a support 45 having an arcuately curved end portion projecting to within close proximity of the peripheries of the rollers 21 and 28 which is adapted to receive the ribbon of sheet-like porous bearing material compressed between the rollers 21 and 28 and to guide the movement thereof in a curvilinear course of relatively large curvature as the compressed ribbon is discharged from the pressure-applying apparatus. The opposite end portion of the support 45 is substantially horizontal and it is constructed and arranged to direct the ribbon of compressed constituents of the porous metal toward the inlet end of a furnace 46, hereinafter more specifically described.

Any desired combination of constituents of porous metals may be placed in the hopper 32 and fed therefrom by the dispensing apparatus 34 to the rollers 21 and 28 by which the material, which is usually in a very finely divided state, is compressed to the form of a sheet-like briquette of any desired thickness, the length of the briquette being determined by the amount of the powdered mixture supplied to the hopper 32 and the thickness thereof being predetermined by the size and adjustment of the rollers 21 and 28 in the foregoing manner.

While a large variety of mixtures of powdered metals and other ingredients may be used, it has been found that the following compositions produce briquettes which, in their unsintered state, will accommodate considerable deflection in order to facilitate continuous removal of the ribbon of compressed powdered materials from the rollers to the furnace in which it is later sintered.

| No. 1 | Per cent by weight |
|---|---|
| Powdered lead | 10 |
| Powdered tin | 10 |
| Powdered graphite | 1½ |
| Powdered boric acid | 1½ |
| Powdered copper | 77 |

| No. 2 | |
|---|---|
| Powdered tin | 10 |
| Powdered boric acid | ½ |
| Exfoliated mica | 1½ |
| Powdered copper | 88 |

|                      | No. 3 | Per cent by weight |
|----------------------|-------|--------------------|
| Powdered copper      |       | 20                 |
| Powdered graphite    |       | 1½                 |
| Powdered boric acid  |       | 1                  |
| Powdered iron        |       | 77.5               |

The percentages of the materials used in the foregoing compositions may be varied within substantially wide limits, the particular proportions recited being given merely as examples of compositions which, it has been found, may be readily compressed into sheet-like briquettes in a continuous briquetting process of the foregoing type. The graphite in compositions Nos. 1 and 3 and the mica in composition No. 2 serve as a lubricant during the compression operation and also remain in the finished product to enhance the lubricating properties thereof. Any suitable solid lubricating material may be used in place of mica and graphite and in some mixtures liquid lubricant such as ordinary lubricating oil may be employed. Mica and graphite have, however, been found to impart a desirable high degree of flexibility to the compressed briquette, which serves prior to sintering to guard against fracture of the ribbon-like briquette discharged from the rollers during handling thereof.

The boric acid also serves as a lubricant during the compressing operation and it has as a further purpose the fluxing of the composition during the sintering operation. Other combined fluxing and lubricating agents, such as stearic acid, polmitic acid and salicyclic acid, may be used for this purpose.

The terminology "bearing material" and "porous bearing metal" appearing in the specification and claims is used in its broad sense and should be construed to include frictional, such as that employed in lining brakes and clutches, as well as anti-frictional materials. In many frictional applications, porous metal formed from powdered mixtures of the foregoing compositions are satisfactory, particularly when the lubricant impregnating operation is omitted.

Sheet-like porous metal, particularly adapted for applications where a relatively high coefficient of friction is desired, such as in clutch and brake linings, can be formed in the foregoing manner from a mixture of powdered constituents having the following composition:

|            | Per cent by weight |
|------------|--------------------|
| Copper     | 79                 |
| Tin        | 9                  |
| Lead       | 5                  |
| Graphite   | 1                  |
| Asbestos   | 5                  |
| Boric acid | 1                  |

The asbestos of the above composition which serves to increase the coefficient of friction of the resulting product can be substituted by aluminum oxide, magnesium oxide, silica or talc in substantially the same proportion.

The furnace 46 is disposed adjacent the discharge end of the support 45 and it has an inlet opening 47 which registers with the latter. Disposed in substantial alignment with the upper surface of the support 45 is a conveyor belt 48 which is movably supported on spaced rollers 49 mounted on the opposite ends of the furnace 46. The upper side of the conveyor 48 extends through the interior 50 of the furnace 46 and through an outlet opening 51 which registers with the inlet opening 47. As the continuous sheet-like briquette leaves the discharge end of the support 45, it is deposited upon the belt 48 of the conveyor by which it is gradually drawn through the interior of the furnace 46 which preferably has a non-oxidizing or reducing atmosphere. A suitable atmosphere may be provided by supplying either hydrogen or illuminating gas of a reducing character to the interior of the furnace. The furnace is preferably maintained at a temperature slightly above the melting point of one of the powdered metal constituents of the mixture of which the briquette is formed and below the melting point of the other metal. If more than two metals are employed in the mixture then the sintering temperature may be above the melting point of two of the metal constituents thereof but below the melting point of the other. The particular temperature is, of course, predetermined by the character of the constituent of the powdered mixture of which the briquette is formed. The conveyor belt 48 is preferably driven by driving mechanism (not shown) which may be operatively connected with one of the pulleys 49.

After the ribbon-like briquette has been sintered, it may be deflected while unsupported, as illustrated in the lower portion of Fig. 1 in order to submerge it in an oil bath 54 so as to impregnate the porous metal structure with a suitable lubricant. This lubricant impregnating step may, if desired, be omitted completely or delayed until after the bearing material has been made up into final form.

After the lubricant impregnating operation or, in the event this step is not employed, after the sintering operation, the ribbon-like strip is passed continuously through a pair of sizing rolls 53 by which it may be brought to a desired thickness for use in applications where slight variations in thickness are not permissible.

The sintered ribbon of porous metal may then be wound into a roll upon a reel, (not shown) or cut into desired lengths for future use. The sheet-like porous metal may be used, in some applications, in its relatively flat state or it may be formed to any desired curvilinear contour and employed for bearing surface purposes.

In Figs. 3 to 9, inclusive, is illustrated one application of our improved porous metal sheeting which comprises the formation of reinforced bearing members. Such bearing members may be conveniently fabricated by cutting the ribbon of porous metal into pieces 59 of desired lengths and placing them upon a piece of sheet metal 60 of corresponding size as illustrated in Fig. 3. The porous metal pieces 59 may comprise unsintered, porous metal sheet-like stock such as that discharged from the roll apparatus, shown in Fig. 1, in advance of the furnace 46 thereof, and may be bonded directly to the sheet metal or metal strips which preferably comprises steel or brass. The layers of reinforcing backing material 60 and unsintered porous metal stock 59 may be arranged in superimposed relation, preferably after suitable cleaning of the backing layer, and then placed under compression in a clamping device generally designated by the numeral 62 and shown in Fig. 4. The clamping device 62 includes a base plate 63 and a spaced bail-like structure 70 64 having a threaded opening 65 in its central portion in which a set screw 66 is threaded.

Disposed between the lower end of the set screw 66 and the upper layer of the structure being clamped is a block 67 which is firmly held by the screw 66 and clamped in clamping engagement upon the superimposed layers of reinforcing and porous metal. The superimposed layers 59 and 60 are then firmly bonded together and the unsintered, compressed sheet of powered metal is simultaneously sintered by the application of heat thereto while they are so held under compression. This may be conveniently accomplished by passing them, while held in their clamps, through a furnace 68 which preferably had a reducing or non-oxidizing atmosphere. A plurality of clamps containing layers of reinforcing material and porous metals may be successively passed through the furnace 68 by supporting the clamps in which they are disposed through the furnace on an endless conveyor 69, in the manner illustrated in Fig. 5.

In Fig. 9 of the drawings is illustrated a modified form of the apparatus by which a ribbon-like discharge of compressed, powdered metals may be simultaneously bonded to a continuous sheet-metal backing and sintered in a continuous operation. This apparatus includes a furnace 46' similar to the furnace 46 shown in Fig. 1 having a continuous belt conveyor 48' of which one length travels through the furnace. A support 151 is provided adjacent the inlet end of the furnace on which is mounted a reel 150 of sheet-metal backing material 152 from which a layer of sheet-metal backing material is fed at a location immediately adjacent the discharge end of the support 45 which is shown in Fig. 2 to be associated with the rolls 21. The backing material may comprise metal strips of diverse thicknesses and may be fed to the discharge of the support 45 in suitable lengths and in any desired manner. The ribbon of compressed, powdered metals formed by the rolls 21 is deposited in superimposed relation upon the sheet-metal backing or metal strip 152 as it leaves the right end of the support 45, as viewed in Fig. 10. The superimposed ribbon of compressed metal powder and backing 152 is fed into the inlet 47' of the furnace 46' while supported upon the conveyor 48' and passed between a pair of pressure rolls 153 mounted in the interior of the furnace 46' or between one roll and any other suitable support. If desired, the conveyer 48' may be omitted and the rollers 153' may be driven in any suitable manner so as to feed the superimposed layers of backing and compressed powdered metal through the furnace. There may be as many pairs of pressure rolls 153 in the furnace as desired. During passage of the backing and ribbon of compressed powdered metals through the furnace 46' the powdered metal ribbon is simultaneously sintered and bonded to the sheet-metal backing, the temperature in the furnace being maintained at a suitable sintering and bonding temperature as, for example, 1500° F. to 1550° F. This temperature may be predetermined in accordance with the character of the composition of the powdered metal which is employed.

When the sintered and bonded assembly is discharged from the discharge end of the furnace 46' it may be introduced into an oil bath, or other suitable lubricant, in order to impregnate the porous metal layer therewith.

In Fig. 6 is diagrammatically illustrated die forming apparatus by which a composite piece of reinforcing sheet metal and sheet porous metal may be conveniently brought to semi-cylindrical shape. This apparatus includes a die part 78 having a cavity 79 therein to which a bearing member blank formed in accordance with the foregoing method may be pressed to semi-cylindrical shape by a ram or die 80.

In Figs. 7 and 8 is illustrated the formation of a cylindrical bearing member from a piece of composite stock produced in accordance with the foregoing method. Initial operation may be conducted in a die part 81 having a cavity 82 therein of U-shaped cross-section into which the bearing member blank may be forced by a die part 83, as illustrated in Fig. 7. The preformed blank may then be transferred to a die, of the character illustrated at 84 in Fig. 8 wherein the parallel side portions of the preformed blank may be conveniently wrapped around the mandrel 85 by a plunger or die part 86 having a substantially semi-cylindrical cavity 87 in its end portion.

In the formation of bearing members of this character, the porous metal layer is preferably disposed internally, but if desired, this condition may be reversed to bring the porous metal layer to the exterior of either a cylindrical or semi-cylindrical bearing member.

Bearings made in accordance with our invention have a comparatively large lubricant absorbing capacity and in many installations may at their place of manufacture be provided with sufficient lubricant to last throughout their normal life. When reinforcing backings are employed, the resulting bearing member is materially strengthened and the porous metal layer thereof is protected from breakage both in service and in shipment. If desired, the seams of the cylindrical bearing shown in Fig. 8 may be welded or otherwise fixed together. Both cylindrical and semi-cylindrical bearings of the above types can be accurately brought to a desired internal diameter by a broaching operation in the same manner as conventional cast bearings are finished.

By simultaneously sintering and bonding a compressed mass of powdered metals on a reinforcing member, it is only necessary to subject the powdered metal to one heat treatment and as a result the physical properties of the powdered metal mass such as softness for bearing purposes is retained. It is also found that a superior bond between the porous metal mass and the reinforcing backing is provided when sintering and bonding take place simultaneously.

Although but several specific embodiments of the invention are herein shown and described, it will be understood that various changes in the sequence of operations, steps and materials employed may be made without departing from the spirit of the invention.

We claim:

1. The method of manufacturing reinforced sheet porous metal containing structures which comprises, applying a substantially flat sheet-like briquette of compressed powdered metal of relatively small thickness to a sheet metal backing of substantially flat contour, simultaneously sintering said briquette and bonding the same to said backing while said briquette and backing are firmly pressed together, and then forming the resulting composite structure to a desired shape by simultaneously operating upon said sintered briquette and said sheet metal backing.

2. The method of making bearing members which comprises continuously forming an elongated sheet-like briquette of compressed powdered metal by passing a charge of powdered metal between opposed rolls, continuously disposing successively formed portions of said briquette in superimposed relation on a correspondingly elongated strip of reinforcing metal, continuously moving said assembly through a furnace and subjecting said assembly to heat and pressure therein to simultaneously sinter said briquette and bond the same to said reinforcing metal, cutting the resulting composite strip of porous and reinforcing metals into blanks having a surface area and dimensions corresponding to the surface area and dimensions of a desired bearing member, and bring said blanks to a desired shape.

3. The method of making a bearing member which comprises applying a substantially flat sheet-like compressed porous metal briquette of relatively small thickness on a surface of a metal backing having a substantially flat contour, simultaneously sintering said briquette and bonding the same to said backing while said briquette and backing are under compression, and then bringing the resulting structure to tubular shape by simultaneously operating upon said bonded together briquette and backing.

4. The method of making porous metal containing structures which comprises continuously forming an elongated sheet-like briquette of compressed powdered metal by passing a charge of powdered metal between opposed rolls, disposing successively formed portions of said briquette on a correspondingly elongated strip of reinforcing metal, moving said assembly into a furnace and subjecting said assembly to heat and pressure therein to simultaneously sinter said briquette and bond the same to said reinforcing metal, and cutting the resulting composite strip of porous and reinforcing metals into blanks of a desired size and shape.

5. The method of making a bearing member which comprises simultaneously sintering and rigidly bonding a substantially flat sheet-like mass of compressed powdered metal of relatively small thickness to a metal backing member while said sheet-like mass and said backing member are firmly pressed together, and then bringing the resulting structure to a desired shape by simultaneously operating upon said bonded together compressed powdered metal and backing

ANTHONY J. LANGHAMMER.
WILLIAM G. CALKINS.